United States Patent [19]

Vølstad

[11] Patent Number: 5,800,261
[45] Date of Patent: Sep. 1, 1998

[54] AIR VENT DEVICE INCLUDING A LIGHT DEVICE TO PREHEAT SUPPLY AIR

[75] Inventor: Ove Charles Vølstad, Kvernaland, Norway

[73] Assignee: Legabeam Norge AS, Norway

[21] Appl. No.: 750,384

[22] PCT Filed: May 31, 1995

[86] PCT No.: PCT/NO95/00087

§ 371 Date: Nov. 27, 1996

§ 102(e) Date: Nov. 27, 1996

[87] PCT Pub. No.: WO95/33959

PCT Pub. Date: Dec. 14, 1995

[30] Foreign Application Priority Data

Jun. 2, 1994 [NO] Norway .................. 942042

[51] Int. Cl.$^6$ .................................................. F24F 7/007
[52] U.S. Cl. ................... 454/272; 362/96; 454/273
[58] Field of Search ........................... 454/254, 271, 454/272, 273, 274, 276, 333, 338, 200, 213; 362/96, 253

[56] References Cited

U.S. PATENT DOCUMENTS

| | | | |
|---|---|---|---|
| 396,187 | 1/1889 | Worthington | 362/96 X |
| 1,555,579 | 9/1925 | Howell | 362/96 X |
| 4,222,316 | 9/1980 | Adam . | |

FOREIGN PATENT DOCUMENTS

| | | | |
|---|---|---|---|
| 56816 | 7/1936 | Norway . | |
| 57180 | 10/1936 | Norway . | |
| 63925 | 9/1941 | Norway . | |
| 174640 | 6/1994 | Norway . | |
| 195399 | 3/1965 | Sweden . | |
| 305030 | 7/1968 | Sweden . | |
| 5371 | 2/1887 | United Kingdom | 454/273 |
| 1319293 | 6/1973 | United Kingdom . | |
| 1388681 | 3/1975 | United Kingdom . | |

*Primary Examiner*—Harold Joyce
*Attorney, Agent, or Firm*—Jenner & Block

[57] ABSTRACT

A device for an air valve, particularly for use with a fresh air inlet through a wall in a habitable room, and wherein the device comprises a receiver consisting substantially of airtight material, and wherein the receiver is adapted to be tightly attached to the wall around the internal valve opening, and wherein the receiver is divided into an outer chamber and an inner chamber, a connection being established between the chambers. To the receiver is attached a bulb holder having a supply of electrical current for a bulb, so that the fresh air stream flows past the bulb and receives heat therefrom before it leaves the receiver and escapes into the habitable room.

2 Claims, 2 Drawing Sheets

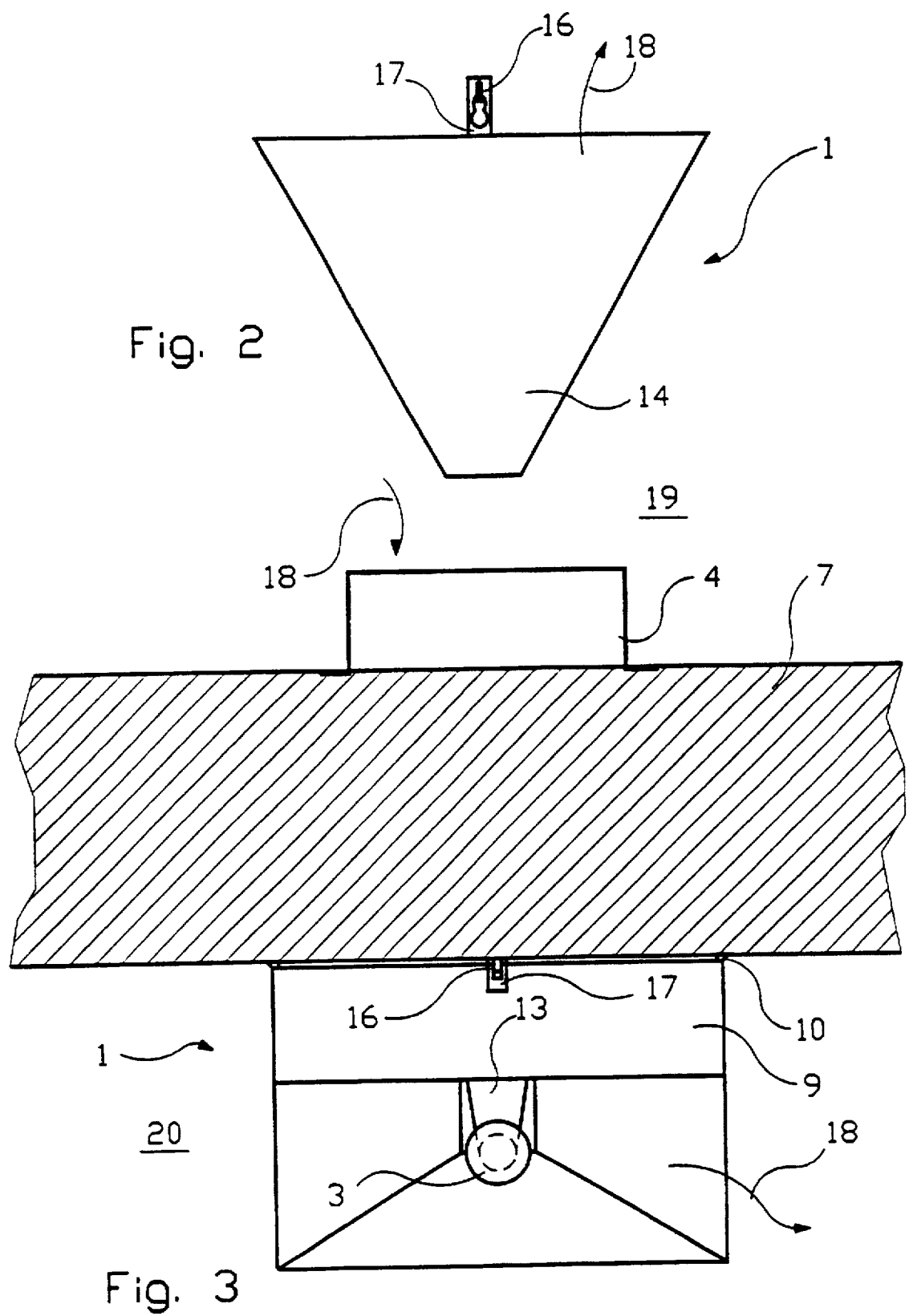

AIR VENT DEVICE INCLUDING A LIGHT DEVICE TO PREHEAT SUPPLY AIR

The present invention relates to a device for an air valve, especially for use at a fresh air inlet through a wall of a living room, and wherein the device comprises an accumulating vat or receiver which preferably consists of metal, plastic or another air-tight material, and wherein the accumulating vat is adapted to be attached tightly to the wall around the internal valve opening, and wherein the accumulating vat is divided into an external room and an internal room, connection between the rooms being established.

Modern house building methods require to a very large extent the use of vapour barriers, such as plastic foils and the like, inside the walls. This results in too tight buildings. This is unfortunate in houses, flats and cottages lacking mechanical ventilation. The same applies also to rooms in which many people are gathered, e.g. class rooms and the like, and in older buildings lacking mechanical ventilation plant. Even in buildings in which mechanical ventilation has been mounted, the buildings become too tight, because the mechanical ventilation plant is sometimes closed, or when the same does not funtion according to the presupposition.

Especially in living rooms or other places where there exists a requirement for sound reduction, a mechanical ventilation plant is often less favourable, not least because of the noice.

More recently it has also been ascertained that ordinary ventilation plants in themselves represent a not insignificant pollution source.

Houses and flats are usually equipped with fresh air valves in windows or have fresh air inlets mounted at a high level in the outer walls. This functions as an air supply in the warm part of the year. In winter time or other times of the year where outdoor temperatures are relatively low, the inflowing air seems draughty and cold. I most cases, this results in a closing of the valve. The consequence is that the house does not "breath" such as required by modern building methods in order to be warrentable.

When the house becomes too tight, this gives i.a. favourable conditions for the growth of mould/humidity, development of micro organisms, bacteria and virus. In its turn, this is a contributory factor to growth of allergy and asthmatic sufferings. This is a very serious and growing problem in all countries in which building is conducted according to moderne principles.

Unfortunately, closed valves are common, resulting in—without the inhabitants in many cases being aware thereof—that modern houses some times may be directly injurious to health.

From NO patent No. 63925, it is previously known an arrangement in an air valve for use with a fresh air inlet through a wall of a living room where the air valve is placed adjacent the floor, outside a radiator for heating the living room, and where the device comprises an accumulating vat or receiver adapted to be tightly attached to the wall around the internal valve opening, and wherein the accumulating vat is divided into an outer room and an inner room, a lowermost connection being established between the rooms, and wherein the inner room is very narrow and positioned close to the radiator, so that the fresh air flowing through the two rooms of the accumulating vat is supplied with heat from the radiator, before it flows out into the living room through an uppermost slot in the inner room of the accumulating vat or receiver.

Two large disadvantages of the device according to NO No. 63925 are 1) that the device is dependent on a radiator, 2) that the device is dependent on that the air valve in the wall is positioned adjacent the floor where the radiator is located, air valves usually being placed high up on the wall. This means that existing air inlet cannot be used with the device, and that a new hole must be bored or drilled in the wall for a new air valve to be used in connection with said device.

From NO patent No. 56816 and NO patent No. 57180, arrangements in air valves of similar kind as the above described device according to NO patent No. 63925 have been previously known, but these devices also suffer from the same two large disadvantages 1) and 2) as mentioned above.

In accordance with the present invention, one aims at a very simple device, securing an efficient air supply, simultaneously as one achieves a pleasant background illumination to the room to be ventilated, the device comprising a usual bulb by which the air supplied becomes pleasantly heated, even during the most extremely low outdoor temperatures to be found, in that the air passes the bulb. This results in that the air supplied is felt as being pleasant, as it is preheated by means of the bulb to above room temperature before it is let in.

In order to utilize the invention, existing valves in outer walls can be used. Without making any encroachment in the existing valve arrangement, the device according to the invention is mounted on the inner side of the wall.

When placing the valve in an open condition, simultaneously as the bulb is switched on, preheated fresh air will flow in in a pleasant way. In other words, one achieves the same effect as with a conventional expensive ventilation plant blowing in preheated fresh air. Additionally, a pleasant background illumination of the actual living room is achieved.

Because of its simpleness, the device according to the invention will be very cheap. The installations do not in any way require expert knowledge, as it does not involve any constructional works, and the device is not dependent on a radiator.

In the following, two preferred embodiments of the device according to the invention are described, reference being made to the accompanying drawings, wherein:

FIG. 2 shows a front view of the device according to FIG. 1;

FIG. 3 shows a plan view/horizontal section of the device according to FIG. 1.

Figure 1:
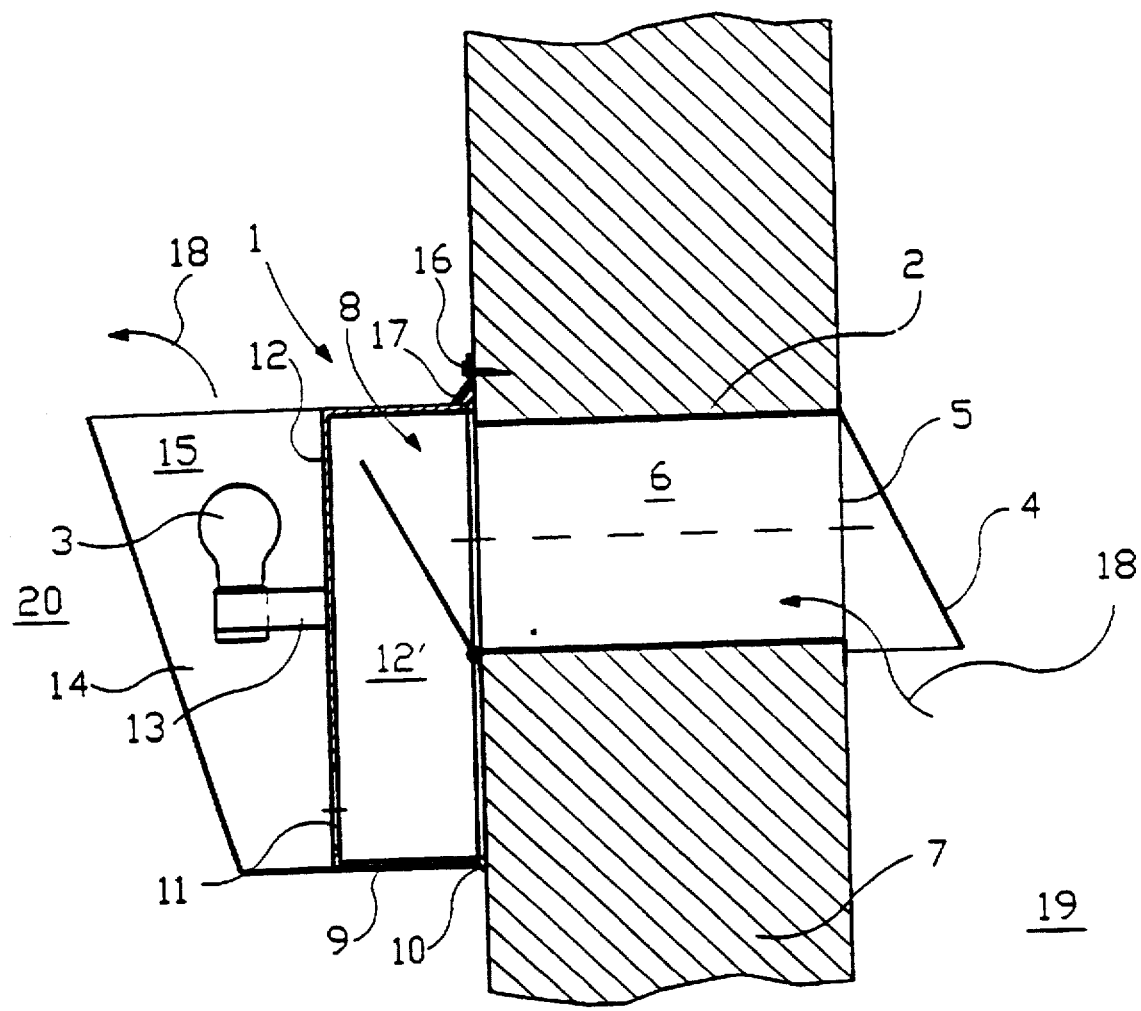
FIG. 1 shows a vertical section of the device, showing the components incorporated in the device according to the invention.

In the drawings, reference numeral 1 denotes the device according to the invention in general, the same being included in a construction comprising a usual air valve 2 in a wall 7 and a bulb 3, these components being interconnected to form a unit. The device 1 is a coherent unit coupled to the air valve 2, which preferably and usually sits in the uppermost portion of the wall 7.

The air valve 2 consists ordinarily of an external storm cap 4, an insect net 5, a channel 6 through the wall 7 and an air inlet 8 at the inner side of the wall. The air valve 2 as described above is not critical and may, therefore, have any design as usually installed in buildings.

In one embodiment, the device 1 comprises an accumulating vat or receiver 9 which is condensate-insulated, and which surrounds the whole air inlet 8 of the valve 2. The accumulating vat or receiver 9 is, as shown in the drawings, somewhat larger than the air inlet 8, and against the wall sealed with a flexible rubber packer 10. In the lowermost portion of the collecting box 9, a hole 11 has been formed in an inner partition wall 12 parallel to the wall 7. At the partition wall 12, an outer room 12' is formed between the partition wall and the wall 7. A carrier 13 into which the bulb is screwed, is fastened to the partition wall 12 and is surrounded by a lamp-shade 14 preferably made of metal, plastic or other air-tight material, and which forms an inner room 15 together with the partition wall 12. The device 1 is suspended from the wall by means of a anchoring point 16, through an attaching means 17.

When the device 1 is interconnected with the air valve 2 such as described, and the bulb 3 has been switched on, outdoor air 18 will be conducted from the outside of the wall through the channel 6 through the wall 7 and into the receiver's 9 room 12', from where it continues into the room 15 through the channel 11 of the partition wall 12, whereafter it becomes heated by the bulb 3 to preheated fresh air which, then, flows into the living room 20. Additionally, one gets illumination from the bulb 3 into the room 20, possibly in the form of an indirect illumination if the lamp-shade 14 has been made of opaque material, and a combination of direct and indirect illumination if the lamp-shade 14 has been made of transparent material.

In the other embodiment, the device 1 consists of the same components as described in the first embodiment, with the exception that the accumulating vat (receiver, collecting box) 9 constitutes a horizontal, relatively long channel coupled to the air valve 2 in a central point on the accumulating vat 9. To the relatively long accumulating box 9 is connected several separate carriers 13 for bulbs 3, which are surrounded by lamp-shades 14, the bulbs 3 being connected in series.

In the second embodiment, the same effect as described in connection with the first embodiment is achieved, the difference consisting in the use of more bulbs 3 and lamp-shades 14 in the second embodiment, meaning a larger amount of light and larger capacity of supplied preheated fresh air to the living room 20.

I claim:

1. A heating device for use with an air valve, for heating a fresh air stream drawn through a fresh air inlet mounted in an exterior wall and into a habitable room, the heating device comprising:

a receiver consisting substantially of air-tight material, the receiver being adapted to be tightly attached to the interior side of an exterior wall having an interior side, an exterior side, and an internal valve opening extending between the interior side and the exterior side, the receiver attached to the interior side being positioned around the internal valve opening, the receiver being divided into an outer chamber and an inner chamber with a connection being established between the chambers in order to permit air to flow from the outer chamber into the inner chamber, a bulb holder having a supply of electrical current being mounted within the inner chamber of the receiver, and a heat-generating bulb being mounted on and electrically connected to the bulb holder for generating heat so that a fresh air stream flowing inwardly through the internal valve opening, the outer chamber, and the inner chamber, will be heated by the heat-generating bulb before the air stream leaves the receiver and escapes into the habitable room.

2. A device as set forth in claim 1, wherein the outer chamber communicates with more than one inner chamber, and wherein each inner chamber contains an electrical heat-generating bulb.

\* \* \* \* \*